United States Patent Office 2,972,261
Patented Feb. 21, 1961

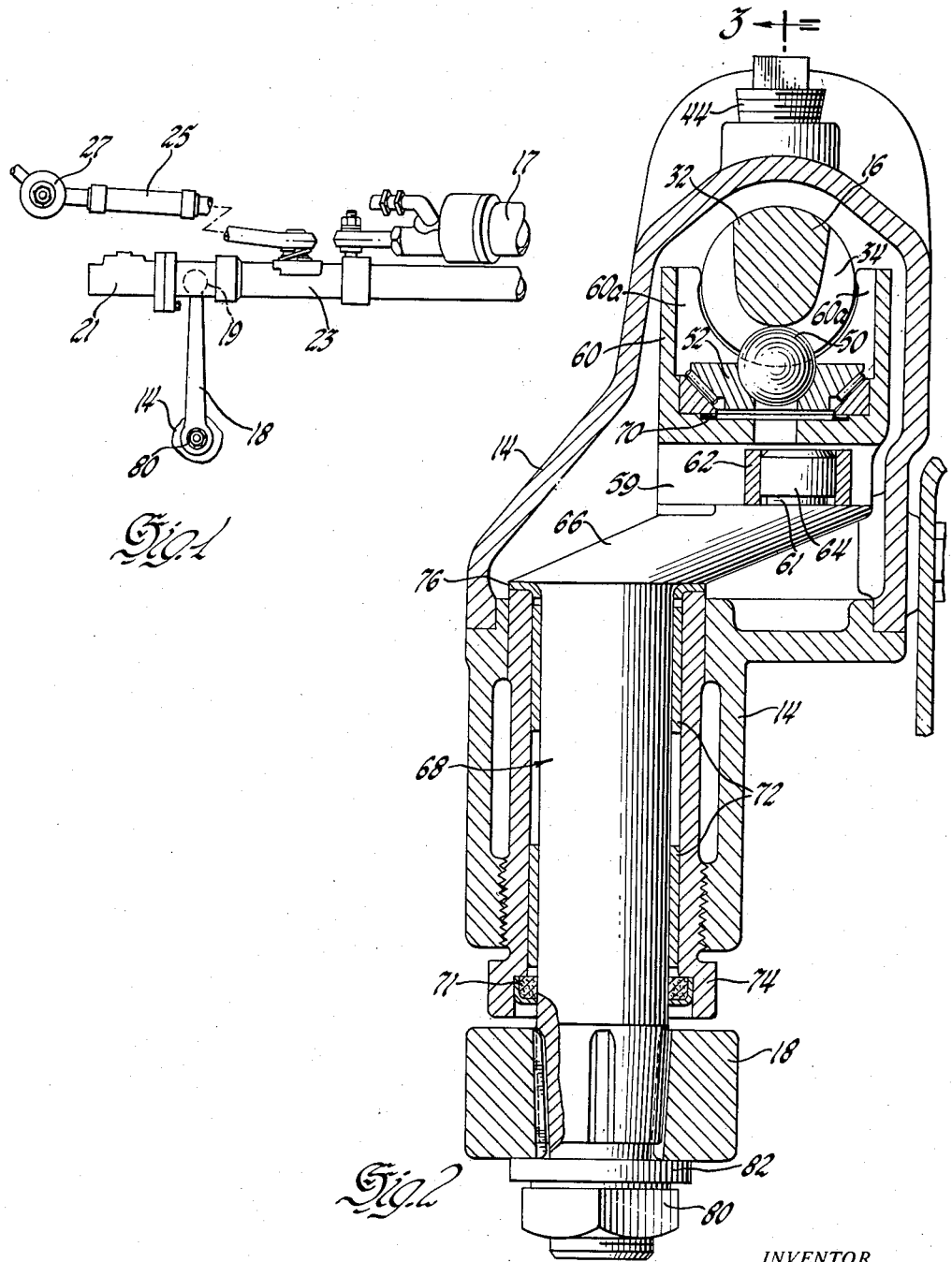

2,972,261

VARIABLE RATIO STEERING GEAR

Robert L. White, Saginaw, Mich., assignor to General Motors Corporation, Detroit, Mich., a corporation of Delaware Filed Dec. 1, 1958, Ser. No. 777,444

9 Claims. (Cl. 74—500)

The present application is a continuation-in-part of Serial No. 721,544, filed March 14, 1958 and hereby abandoned.

This invention relates to a system of reduction gearing whereby a varying angular output is achieved from a constant angular input. In its most particular aspect, the invention concerns a variable ratio power steering gear, i.e., a steering gear providing a varying mechanical advantage in either or both directions off-center. While considered especially advantageous in the automotive field, the invention finds application in other directions as, for example, in ship steering or in the directional control of aircraft, both aloft and on the runway.

Before the advent of power steering, as applied in the automotive field, and beginning particularly with the introduction of the "balloon tire," steering gear ratios were substantially increased so as to lessen the effort required at the steering wheel. Further increases were subsequently made as tires became still larger and as automobiles became generally heavier with higher front end loadings. Thus, steering gear ratios upwards of 23:1 were not uncommon, requiring as many as five or six complete turns of the steering wheel to carry the dirigible wheels from lock to lock—an obvious inconvenience.

With the advent of power steering, it became possible to decrease the steering ratio to substantially any desired figure; but, for safety reasons, it was deemed advisable to effect the reduction gradually from year to year with an ultimate goal of perhaps 8–12:1. Further experimentation and study, however, have compelled the conclusion that with such a ratio the steering gear in the case of a majority of drivers is overly sensitive through the area corresponding to the incidental steering required to maintain a vehicle on a straight course when traveling a straight or substantially straight roadway.

In accordance with the present invention, I answer to the indicated problem by providing in a steering gear a varying ratio whereby, in operation of the vehicle, relatively more turns of the steering wheel are required through the center area to swing the dirigible wheels a given number of degrees than are required to swing the dirigible wheels such number of degrees when the dirigible wheels are already displaced to an extent whereat the steering parts are displaced from center in one direction or the other. Most preferably, the ratio decrease off-center is progressive to the point of a predetermined minimum figure which may hold through a selected distance near the lock positions. As a result of my invention, the sensitivity of the steering gear is substantially optimum under straight-ahead highway conditions while, during parking and maneuvering in close quarters, the necessary angular displacements of the dirigible wheels can be effected without excessive turning of the steering wheel.

In the accompanying drawings illustrating the invention in a preferred embodiment:

Figure 1 is a fragmentary plan of a steering system of a type to which the invention is applicable;

Figure 2 is a sectional view on the line 2—2 in Figure 3; and

Figure 3:
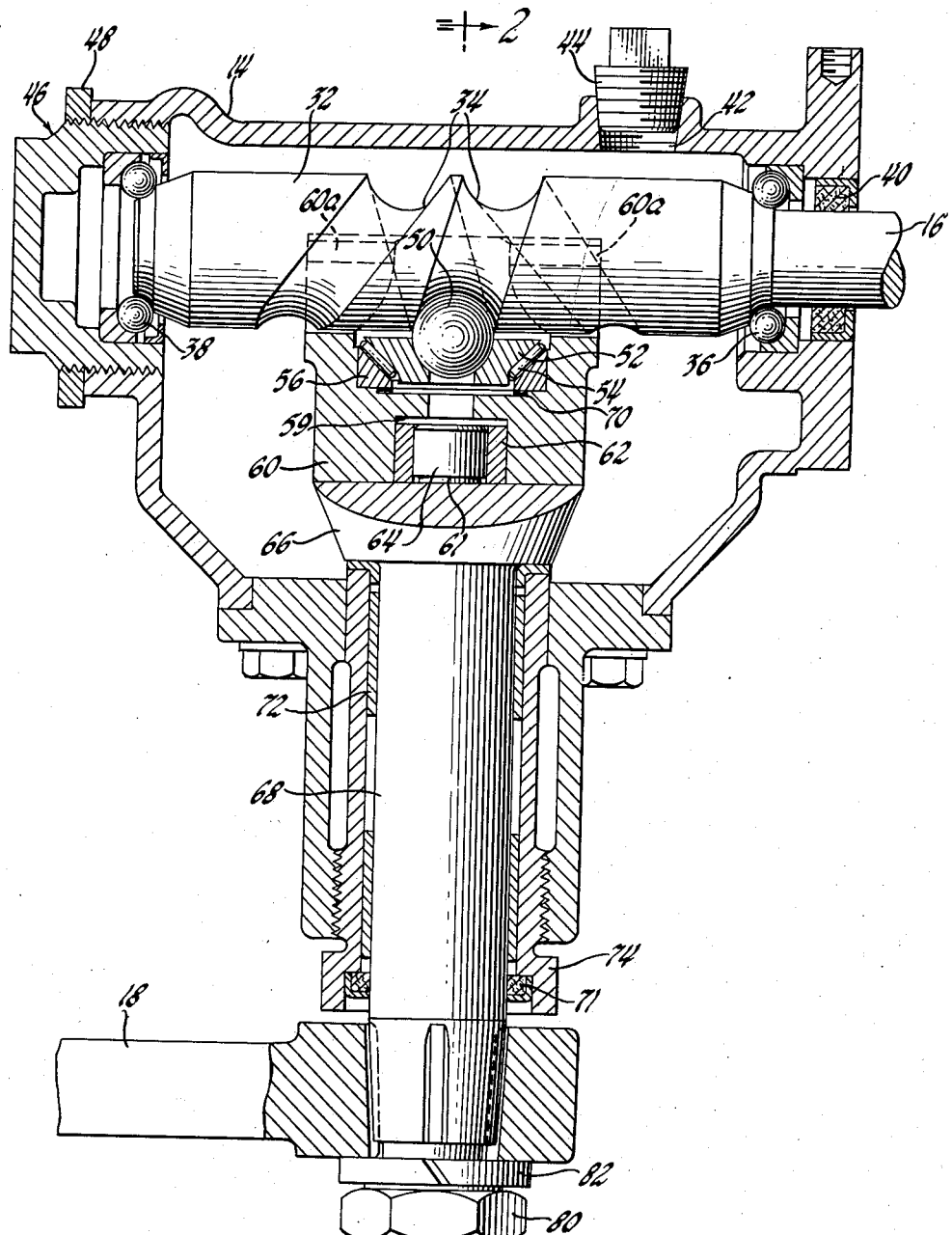
Figure 3 is a sectional view on the line 3—3 in Figure 2.

Feferring first to Figure 1, there is shown a pitman 18 actuated by a pitman shaft indicated by the numeral 68 in Figures 2 and 3. The pitman 18 terminates in a ball stud 19 through which it actuates a valve spool, not shown, confined within a housing 21 made fast at the end of a steering relay rod 23. This rod has pivotally connected thereto, near each end thereof, a tie rod 25 operably connected to a steering knuckle 27. The valve 21 controls a fluid motor 17 pivotally connected to the relay rod 23 and reacting against a fixed portion of the vehicle. The system represented will be found described in detail in United States Patent No. 2,757,748. Suffice it to say here, that on movement of the control valve spool, pressure fluid is admitted to one end or the other of the fluid motor, as determined by the direction of rotation of the steering shaft, seen at 16 in Fig. 3, to provide the desired power assist.

Going now to Figures 2 and 3, it will be seen that the steering shaft 16 terminates in a worm or cam 32 having a variable lead 34, giving the effects indicated in the forepart hereof. Worm 32 turns in thrust bearings 36, 38, the race for the bearings 36 being disposed just inwardly of a seal 40 preventing the escape of lubricant introduced through an aperture 42, closed by a plug 44. The race for the bearings 38 shoulder into an adjustor 46 threaded into the casing 14 and secured by lock ring 48. The purpose of the adjustor is to preload the two bearings.

A ball follower 50 accommodated in part in groove 34 is held in place by a seat 52, which acts also as the upper race for needle bearings 54. As shown, the assembly including a cup-shaped lower bearing race 56 is nested in a carrier member 60 having ribs 60a. Such carrier member below the needle bearing assembly, is provided with a transverse slot 59 accommodating a bushing 62 and a roller 64, the latter being adapted to turn on a pin 61 fixed to, or integral with, the crank portion 66 of the pitman operating shaft 68. A spring 70 serves to compensate for any dimensional looseness between the parts thereabove.

Shaft 68 extends through an oil seal 71 and turns in bushings 72. An adjustor 74, threaded into the boss portion of the casing 14 and bearing at its inner end against a ring 76 which has a measure of resilience, operates to preload the shaft. At its end external of casing 14, shaft 68 is keyed for connection to the pitman 18 and has threaded thereon a nut 80 securing the pitman thereto. Such nut is secured against loosening by a lock washer 82.

In the operation of the gear, rotation of the variable lead worm 32 exerts a linearly acting force on the follower 50, causing the carrier member 60 to travel along the axis of the worm. This action proceeds with rotation of the ball seat 52 on the needle bearings 54 and, with sliding movement of the pin 61 and the roller 64 carried thereon in the slot 59. Due to the crank portion 66, the linear movement of the carrier member 60 brings around rotation of the shaft 68 with swinging of the pitman 18 in a direction determined by the direction of rotation of the worm. Ribs 60a, by engagement with the crest of the worm threads, preclude any wobbling of the carrier member.

It is to be noted that the movement of the pin 61 in the transverse slot 59 produces a variable motion which is additive to that provided by the worm lead. As preferably formed, the groove 34, to assure a snug fit of the ball 50, has a greater pitch diameter through the center area than through the off-center areas. Spring 70, as previously indicated, operates to eliminate lash between the worm and the ball 50 in the off-center areas.

It is to be understood that the invention is not limited to a gear having a worm lead as shown, requiring more input turns at the shaft 16 through the center area than in the off-center areas to achieve a given measure of rotation of the pitman 18, for in some applications it may be found desirable to reverse the ratios or to otherwise change them.

What is claimed is:

1. Reduction gearing comprising a variable lead worm, a ball accommodated in the worm groove, a carrier member affording support to said ball through a bearing assembly including an upper race rotating on rotation of said worm, said carrier member being moved axially of the worm by said ball on rotation of the worm and having a transverse slot therein, and a crank arm operably connected to said carrier member for rotation thereby through a pin accommodated in said slot.

2. Reduction gearing according to claim 1 where said pin mounts a roller which engages the wall of said slot.

3. Reduction gearing comprising a variable lead worm, a ball accommodated in the worm groove, a carrier member affording support to said ball and movable axially of the worm by the ball on rotation of the worm, said carrier member being cup-like in conformation and having inwardly extending ribs embracing said worm, said ribs serving to stabilize the carrier member, and a crank arm operably connected to said carrier member for rotation thereby.

4. Reduction gearing comprising a rotary input member, a worm rotated by said input member, a ball accommodated in part in the worm groove, a carrier member affording support to said ball, said carrier member being moved axially of the worm by the ball on rotation of the worm, said carrier member being cup-like in conformation and having inwardly extending ribs embracing said worm, said ribs serving to stabilize the carrier member, and a crank arm operably connected to said carrier member for rotation thereby, the lead of said worm being such that for a given amount of rotation of said crank arm more turns of said input member are required through the center area of the worm than are required through the off-center areas thereof.

5. Reduction gearing comprising a variable lead worm, a ball accommodated in the worm groove, a carrier member affording support to said ball through a bearing assembly including an upper race rotating on rotation of said worm, said carrier member being moved axially of the worm by said ball on rotation of the worm and having a transverse slot therein, said carrier member being cup-like in conformation and having inwardly extending ribs embracing said worm, said ribs serving to stabilize the carrier member, and a crank arm operably connected to said carrier member for rotation thereby through a pin accommodated in said slot.

6. Reduction gearing comprising a variable lead worm, a ball accommodated in the worm groove, a seat for said ball, a carrier member affording support to said seat and movable axially of the worm by the ball on rotation of the worm, said seat being rotatable relative to said carrier member, and a crank arm operably connected to said carrier member for rotation thereby.

7. Reduction gearing comprising a variable lead worm, a ball accommodated in the worm groove, a seat for said ball, a carrier member affording support to said seat and movable axially of the worm by the ball on rotation of the worm, said seat being rotatable relative to said carrier member, and a crank arm having a pin and slot connection with said carrier member.

8. Reduction gearing comprising a variable lead worm, a ball accommodated in the worm groove, a seat for said ball, a transversely slotted carrier member affording support to said seat and movable axially of the worm by the ball on rotation of the worm, said seat being rotatable relative to said carrier member, and a crank arm connected to said carrier member through a pin carried thereby, said pin being received in the slot in said carrier member.

9. Reduction gearing comprising a rotary input member, a worm rotated by said input member, a ball accommodated in part in the worm groove, a seat for said ball, a carrier member affording support to said seat, said seat being rotatable relative to said carrier member, said carrier member being moved axially of the worm by the ball on rotation of the worm, and a crank arm operably connected to said carrier member for rotation thereby, the lead of said worm being such that for a given amount of rotation of said crank arm more turns of said input member are required through the center area of the worm than are required through the off-center areas thereof.

References Cited in the file of this patent

UNITED STATES PATENTS

| | | |
|---|---|---|
| 1,567,997 | Ross | Dec. 29, 1925 |
| 1,725,738 | Noble | Aug. 20, 1929 |
| 1,871,134 | Ross | Aug. 9, 1932 |
| 2,012,028 | Twyman | Aug. 20, 1935 |
| 2,102,296 | Twyman | Dec. 14, 1937 |
| 2,448,701 | Briggs | Sept. 7, 1948 |